June 21, 1932.  C. A. J. ANDERSEN  1,863,959
BEET BLOCKER
Filed May 12, 1930   4 Sheets-Sheet 2
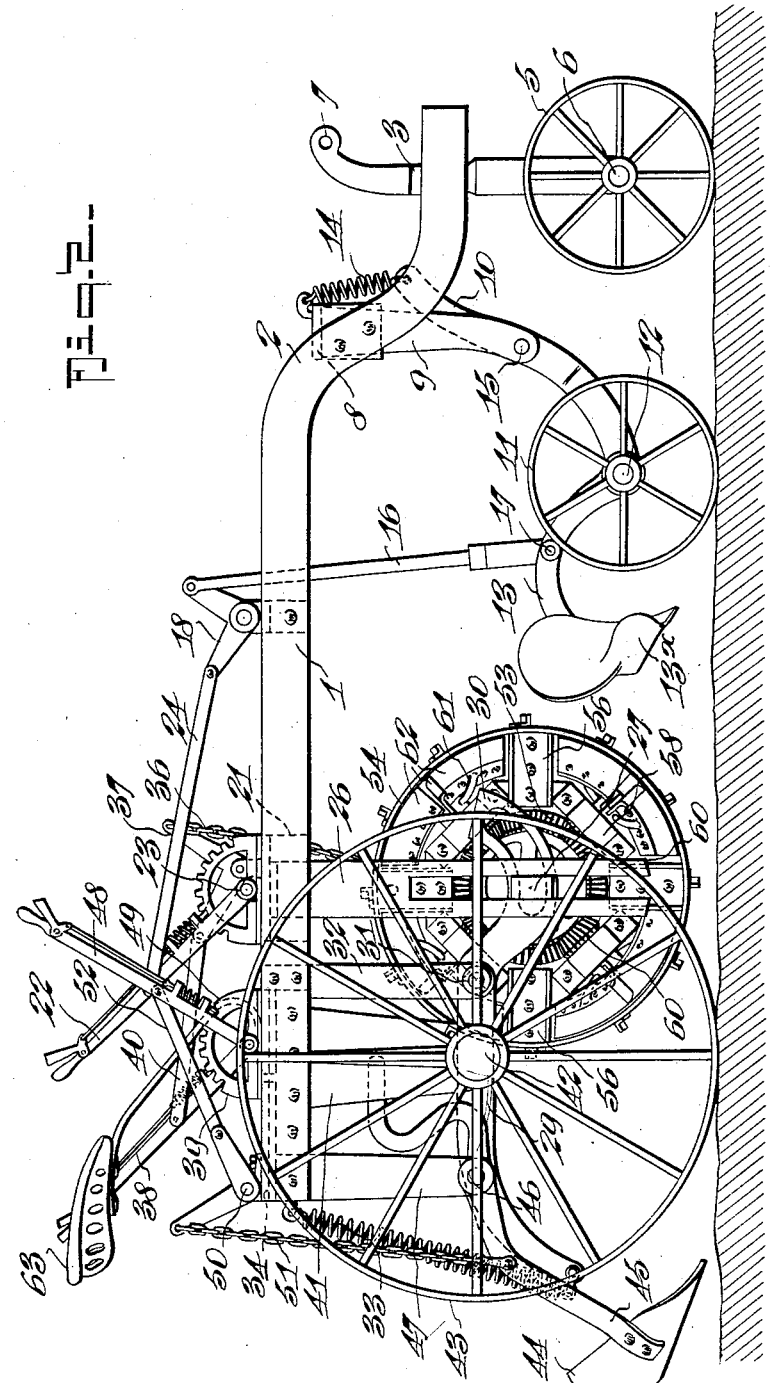
INVENTOR
Carl A. J. Andersen.
BY
ATTORNEY June 21, 1932. C. A. J. ANDERSEN 1,863,959
BEET BLOCKER
Filed May 12, 1930 4 Sheets-Sheet 3
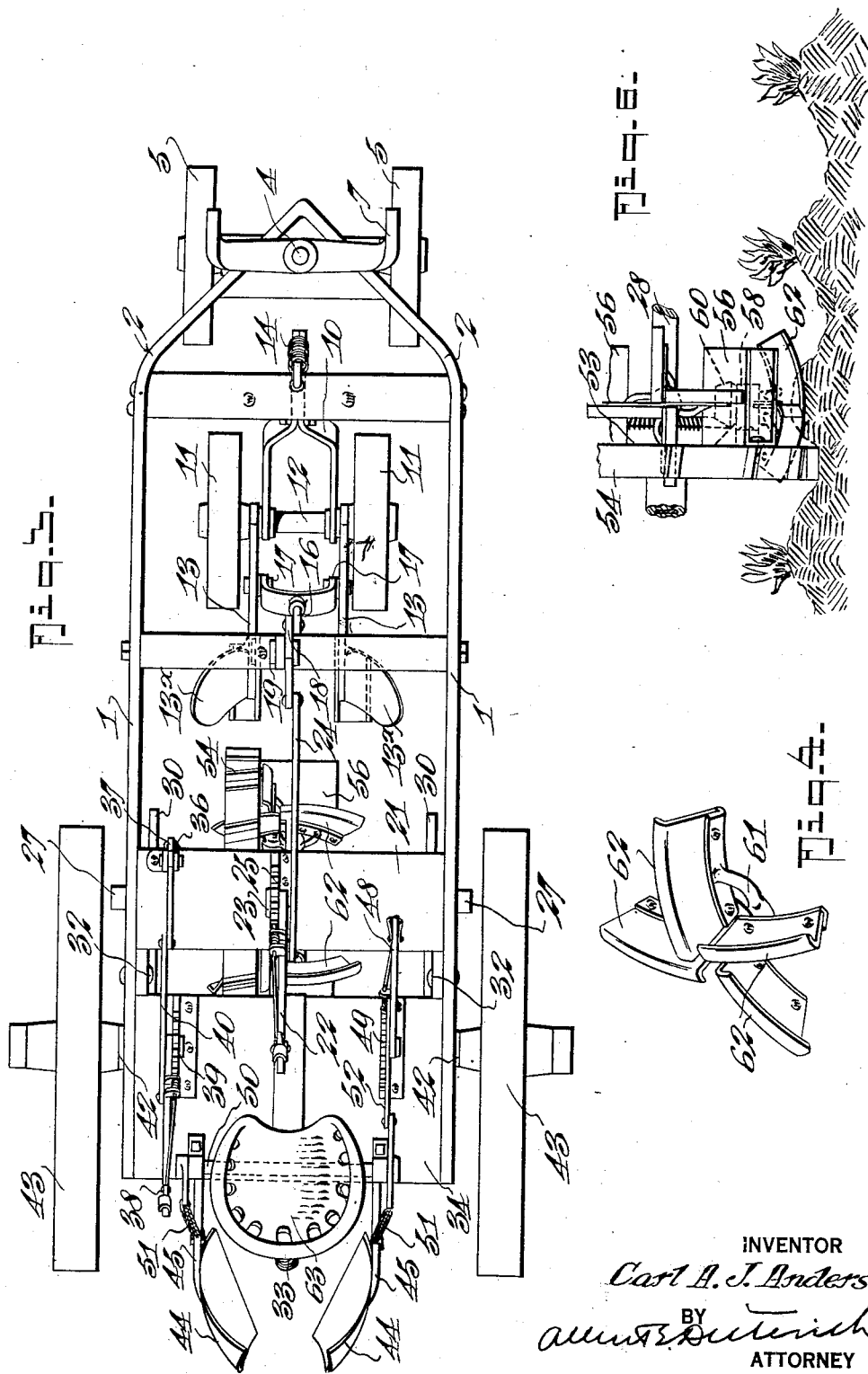
INVENTOR
Carl A. J. Andersen
BY
ATTORNEY

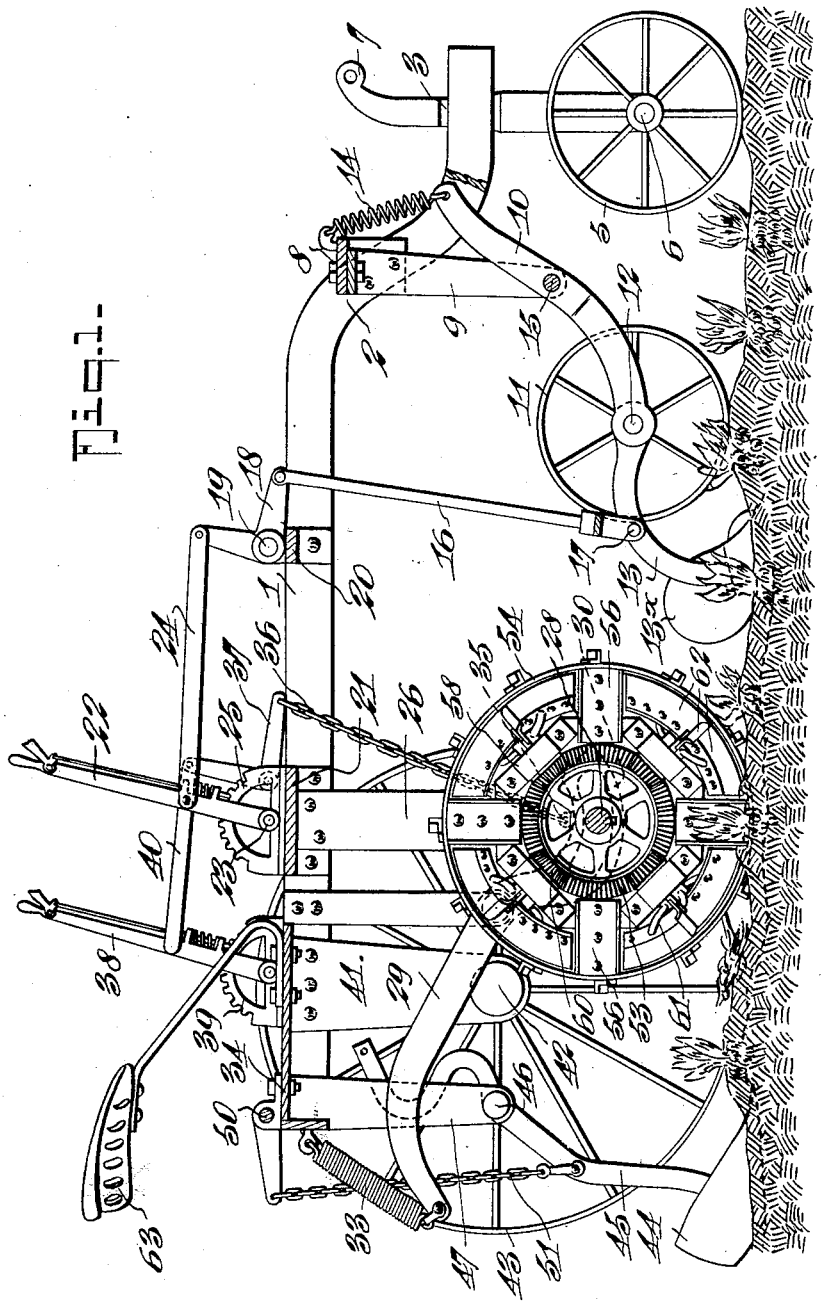

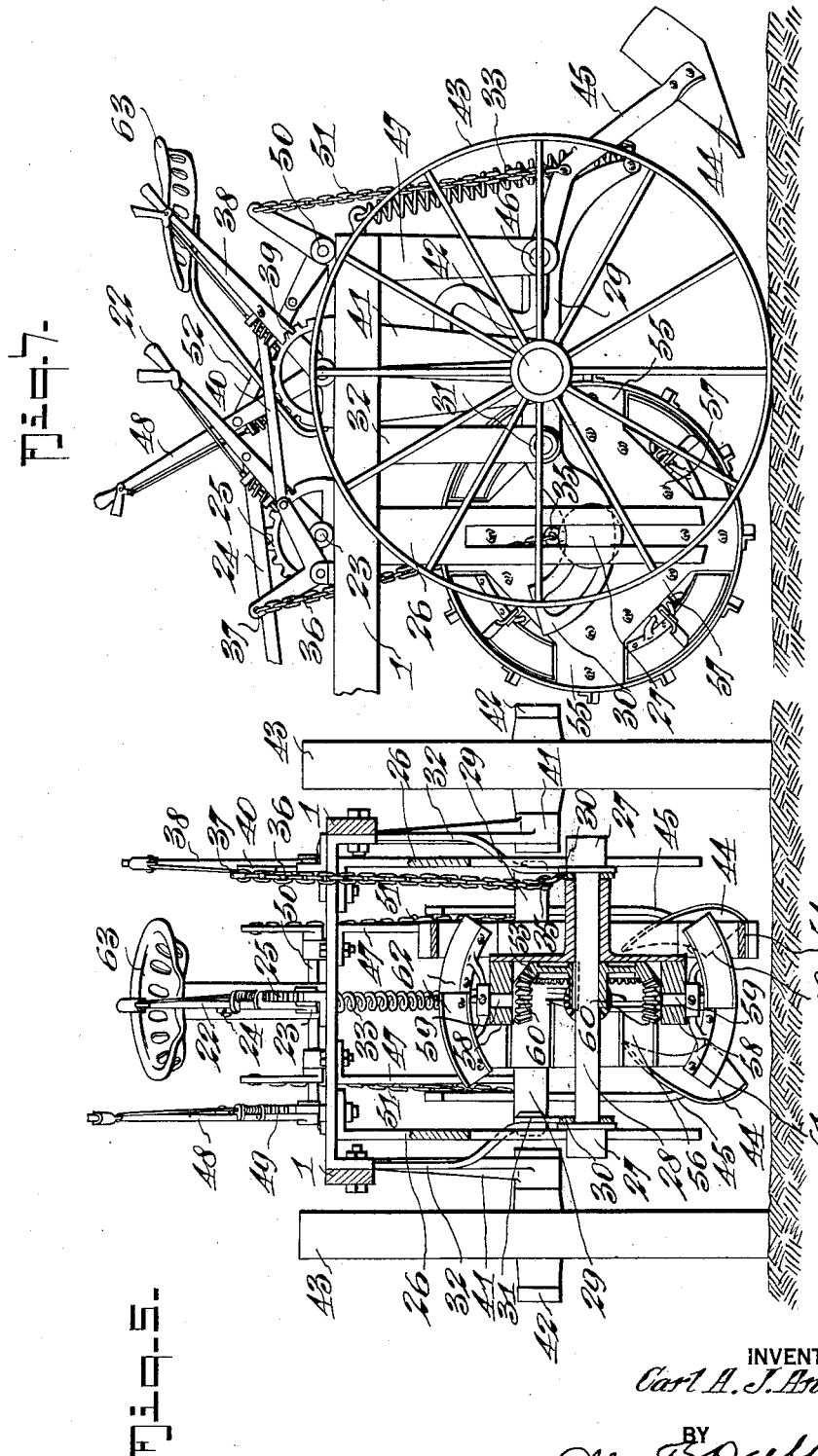

Patented June 21, 1932

1,863,959

UNITED STATES PATENT OFFICE

CARL ALF JOAKIM ANDERSEN, OF SALT LAKE CITY, UTAH

BEET BLOCKER

Application filed May 12, 1930. Serial No. 451,757.

My invention relates to machines for blocking or cutting out the superfluous plants and vegetation of vegetables that are planted in rows, especially beets.

Primarily, the invetnion has for an object to provide a machine of simple rugged construction which will at the same time plow the furrows, block the plants, and mound them regardless of whether the ground traversed is flat or undulated.

Further, the invention has for an object to provide means for holding the furrow plow at one certain depth at all times regardless of the rise and fall of the ground being traversed, thereby enabling the maintenance of a corresponding relation between the traction wheel of the blocker unit and the blocking knives and plant guards.

Further, it is an object to provide a blocker unit consisting of a traction wheel which carries rotary blocking knives and intermediate thereof it carries plant guards, the latter serving to protect the plants while the knives are operating between adjacent plants in the row.

Further, it is an object to provide a machine in which the blocker unit is mounted to rise and fall with the unevenness of the ground.

Further, it is an object to provide an operator's platform from which the controls for the plows, the blocker unit and the coverers may be manipulated by a single operator.

Further, it is an object to provide a blocker unit whose cutting blades are removably mounted for the purpose of repair, replacement and sharpening thereof.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:

Figure 1 is a sectional view of the machine in use.

Figure 2 is a side elevation with the plows and blocker wheel raised.

Figure 3 is a plan view of the machine.

Figure 4 is a detail perspective view of the rotary blocker knives.

Figure 5 is a detail cross section taken through the center of the blocker wheel.

Figure 6 is a detail end elevation showing the beet protectors and blocker knives.

Figure 7 is an elevation of the rear part of the machine looking from the other side.

In the drawings, in which like numerals of reference indicate like parts in all of the figures, the frame of the machine is composed of longitudinal side bars 1 which are downwardly offset at the front as at 2 and have their front ends converged to carry a caster wheel bearing 3 in which the standard 4 of a caster is swivelly mounted. The caster includes the wheels 5 mounted on stub shafts 6 and a suitable draft yoke 7 as shown.

8 designates the front cross bar of the frame from which depends a pair of brackets or vertical standards 9 in which the furrow-opening plow-wheel supporting forked lever 10 is pivoted as at 15. Suitably journalled on a shaft 12 is a pair of wheels 11. The furrow opening plow beams 13 which carry the plows 13x proper are pivotally mounted at their ends on the shaft or axle 12 so as to rise and fall with respect to the axle.

A spring 14 connects the front end of the lever 10 with the cross bar 8 and continuously tends to force the wheels 11 toward the ground.

The furrow opening plows are lifted and lowered by means of a rod 16 that is pivoted at 17 to the plow beams 13 and is also connected to one leg of a bell crank lever 18 that is pivotally mounted at 19 on an intermediate cross bar 20 of the frame. A second intermediate cross bar 21 is located further to the rear of the frame and carries a rack segment 25 that cooperates with the pawl lever 22 that is pivoted at 23 and is connected by a connecting rod 24 to the arm of the bell crank 18.

26 represents a pair of slotted standards secured to the cross bar 21 at the sides of the frame, and in the slots of which slide blocks 27 rise and fall. These blocks 27 carry the ends of a fixed or non-rotatable shaft 28 constituting a part of the blocker proper.

Yoke frames 29 are provided having slotted ends 30 and pivoted at 31 to brackets 32 depending from the side bars 1 of the frame. A spring 33 connects the rear end of the yoke frames 29 with the edge of the rear platform 34 and continuously tends to lower the blocks 27 and shaft 28.

A lifting eye 35 is mounted on the yoke shaft 29 and connected by a chain or other flexible connection 36 with one arm of a bell crank lever 37, the other arm of which connects through a connecting rod 40 with the pawl lever 38 that is mounted on the platform of the frame and cooperates with a rack segment 39 as shown.

Main supporting wheel standards 41 are provided with stub shafts 42 on which the main supporting wheels 43 are journalled.

To the rear of the main supporting wheels I locate covering or mounding scrapers 44 carried by individual beams 45 that are pivoted at 46 to brackets 47 and are raised and lowered by means of a pawl lever 48 pivotally mounted on the rear platform 34 and cooperating with a rack segment 49 as shown. A bell crank shaft 50 is connected with the beams 45 by means of chains 51 while a connecting rod 52 connects the lever 48 with the shaft 50.

The blocker unit comprises the shaft 28 on which is rigidly mounted a bevelled master gear 53 and on which, adjacent the bevelled gear, is rotatably mounted the traction wheel 54.

The blocker traction wheel 54 has spokes 55 and a hub and web structure 57. On the web structure, at suitable intervals, are plant guards 56 of approximately U-shape in plan. The diameter of the web 57 is such that a series of plant guards 56 may be carried thereby at such intervals from one another as to enable the plant guards to locate themselves over the plants in the row which are to be blocked, while the machine is being drawn along.

Secured to the web 57, midway between adjacent plant guards 56, are bearing elements 58 in which are rotatably mounted the shafts 59 that carry the rotary blocking knives and which have bevelled pinions 60 to mesh with the master gear 53 in order to impart rotation to the blocker knife heads 61. The blades 62 are detachably connected to the blocker knife heads 61 in order that the said blades may be removed for sharpening and in order that replacements may be made when necessary.

63 is a suitable seat mounted on the platform 34 for the operator, the various control levers being conveniently located with respect to the seat so that the operator may make the required adjustments from time to time.

So far as described, the operation of the invention is as follows:

The machine being drawn over the field and along over the rows of plants, straddling the same, provides for the plowing of a furrow (preferably) at each side of the row of plants to be blocked, the bottom of the furrow being formed at a definite distance from the surface of the ground so long as the machine is being drawn over the field and regardless of the undulations of the ground. One of the furrows is in alignment with the blocker unit traction wheel 54 which runs in that furrow on the bottom of the same and is free to rise and fall by virtue of the fact that the shaft 28 has its slide blocks 27 vertically slidable in the sliding standards 26, it being understood, of course, that the operator releases the control lever for the blocker wheel so that the wheel will run on the bottom of the furrow and rise and fall, the chain 36 permitting the rising and falling of the blocker traction wheel without changing the adjustment of the control lever therefor. By reason of the fact that the wheels 11 are arranged to run on the surface of the ground and rise and fall with the undulations thereof, it follows that as the wheels rise the plows 13a will be proportionately tilted, so that the depths of penetrations of the plows 13a will remain the same at all times.

When the wheels go up an incline the plows go down and vice versa. This is accomplished because of the fact that the rod 16 is relatively rigid and its connection with the operating lever 22, when once that lever is set, is in effect a rigid connection.

As the machine is drawn over the row of plants, the plant guards will be brought into position over and embracing those plants which are spaced certain definite distances apart while the ground between those plants is at the same time brought under the influence of the rotary cutters. As the machine continues the portion of the row which has been blocked by the rotary cutters comes under the influence of the covers or mounding scrapers 44, which mound the ground that is located between the adjacent furrows and in which the retained plants are established.

From the foregoing description, taken in connection with the accompanying drawings, it is thought the construction, operation and advantages of my invention will be clear to those skilled in the art to which it appertains, and I desire it understood that slight changes in the details of construction, combination and arrangement of parts may be made without departing from the spirit of the invention or the scope of the appended claims.

What I claim is:

1. In a plant blocking machine, a frame and supporting wheels therefor, a furrow forming plow mounted at the fore part of said frame, a blocker mounted on the frame to the rear of said plow, said unit comprising a traction wheel to run in the furrow formed by said plow, a set of plant guards mounted on said traction wheel, and a set of blocker knives mounted on said traction wheel between adjacent plant guards, and means effected by rotation of said traction wheel for causing said plant guards and knives to function.

2. In a plant blocking machine, a frame and supporting wheels therefor, a furrow forming plow mounted at the fore part of said frame, a blocker mounted on the frame to the rear of said plow, said unit comprising a traction wheel to run in the furrow formed by said plow, a set of plant guards mounted on said traction wheel, and a set of blocker knives rotatably mounted on said traction wheel between adjacent plant guards, and means effected by rotation of said traction wheel for causing said plant guards and knives to function.

3. In a plant blocking machine, a frame and supporting wheels therefor, a furrow forming plow mounted at the fore part of said frame, a blocker mounted on the frame to the rear of said plow, said unit comprising a traction wheel to run in the furrow formed by said plow, a set of plant guards mounted on said traction wheel, and a set of blocker knives mounted on said traction wheel between adjacent plant guards, and means effected by rotation of said traction wheel for causing said plant guards and knives to function, and a set of mounding scrapers mounted on said frame to the rear of said blocker unit.

4. In a plant blocking machine, a frame and supporting wheels therefor, a furrow forming plow mounted at the fore part of said frame, a blocker mounted on the frame to the rear of said plow, said unit comprising a traction wheel to run in the furrow formed by said plow, a set of plant guards mounted on said traction wheel, and a set of blocker knives rotatably mounted on said traction wheel between adjacent plant guards, and means effected by rotation of said traction wheel for causing said plant guards and knives to function, and a set of mounding scrapers mounted on said frame to the rear of said blocker unit.

5. In a plant blocking machine, a frame and supporting wheels therefor, a blocker unit mounted thereon with provisions permitting rising and falling of said unit with the contour of the ground traversed, a furrow forming plow unit mounted on said frame in advance of said blocker unit, said blocker unit including a traction wheel aligned with said furrow forming plow unit to run in the furrow formed thereby, and means constituting a part of said plow unit for maintaining the plow share of said unit at a definite depth below the surface of the ground regardless of the variations in contour of the ground traversed.

6. In a plant blocking machine, a frame and supporting wheels therefor, a blocker unit mounted thereon and having provisions for rising and falling with the contour of the ground, and a self-governing furrow forming plow unit mounted on said frame in advance of said blocker unit, said plow unit including a pivotally mounted articulated plow share carrying device, ground wheels for said device, means continuously tending to hold said wheels to the ground, and means governed by the rise and fall of said wheels in passing over the ground for shifting said plow share accordingly with respect to the surface of the ground while maintaining it a definite distance below the surface of the ground.

7. In a plant blocking machine, a frame and supporting wheels therefor, a blocker unit mounted beneath the same, means located in advance of said unit for forming a continuous furrow, and furrow mounding scrapers to the rear of said unit, said blocker unit comprising a non-rotatable shaft, vertically slotted brackets for mounting said shaft, a spring-pressed lever engaging said shaft for lowering same, manually operable means for raising said shaft, a master gear secured to said shaft, a traction wheel journalled on said shaft, a series of plant guards carried by said traction wheel at definite intervals circumferentially, rotating blocker knife elements located on said traction wheel intermediate said guards and in cooperative association therewith.

8. In a plant blocking machine, a frame and supporting wheels therefor, a blocker unit mounted beneath the same, means located in advance of said unit for forming a continuous furrow, and furrow mounding scrapers to the rear of said unit, said blocker unit comprising a nonrotatable shaft, vertically slotted brackets for mounting said shaft, a spring-pressed lever engaging said shaft for lowering same, manually operable means for raising said shaft and including a flexible connection, a master gear secured to said shaft, a traction wheel journaled on said shaft, a series of plant guards carried by said traction wheel at definite intervals circumferentially, rotating blocker knife elements located on said traction wheel intermediate said guards and in cooperative association therewith.

9. In a plant blocking machine, a frame and supporting wheels therefor, a blocker unit mounted beneath the same, means located in advance of said unit for forming a continuous furrow, and furrow mounding scrapers to the rear of said unit, said blocker unit comprising a non-rotatable shaft, vertically slotted brackets for mounting said shaft, a spring-pressed lever engaging said shaft for lowering same, manually operable means for raising said shaft, a master gear secured to said shaft, a traction wheel journalled on said shaft, a series of plant guards carried by said traction wheel at definite intervals circumferentially, rotating blocker knife elements located on said traction wheel intermediate said guards and in cooperative association therewith, said blocker knife elements comprising rotating shafts with pinions to mesh with said master gear and with detachable cutting blades.

10. In a plant blocking machine wherein is provided a wheel-supported frame carrying furrow forming mechanism; a blocker unit mounted on the frame to the rear of said mechanism and comprising a traction wheel to run in the furrow formed by said mechanism, a set of plant guards mounted on the traction wheel, and a set of blocker knives rotatably mounted on said traction wheel between adjacent plant guards, and means effected by rotation of said traction wheel for causing said plant guards and knives to function.

11. In a plant blocking machine wherein is provided a wheel-supported frame carrying furrow forming mechanism; a blocker unit mounted on said frame to the rear of said furrow forming mechanism and comprising a non-rotatable shaft, vertically slotted brackets for mounting said shaft on said frame, a spring-pressed lever engaging said shaft for lowering the same, manually operable means for raising said shaft, a master gear secured to said shaft, a traction wheel journalled on said shaft, a series of plant guards carried by said traction wheel at definite intervals circumferentially, rotating blocker knife elements located on said traction wheel intermediate said guards and in cooperative relation therewith.

12. In a plant blocking machine wherein is provided a wheel-supported frame carrying furrow forming mechanism; a blocker unit mounted on said frame to the rear of said furrow forming mechanism and comprising a non-rotatable shaft, vertically slotted brackets for mounting said shaft on said frame, a spring-pressed lever engaging said shaft for lowering the same, manually operable means for raising said shaft, a master gear secured to said shaft, a traction wheel journalled on said shaft, a series of plant guards carried by said traction wheel at definite intervals circumferentially, rotating blocker knife elements located on said traction wheel intermediate said guards and in cooperative relation therewith, said blocker knife elements comprising rotating shafts with pinions to mesh with said master gear and with detachable cutting blades.

13. In plant blocking machines wherein is provided a wheeled frame with a blocker unit mounted thereon and having provisions for rising and falling with the contour of the ground; a self-governing furrow forming plow unit mounted on said frame in advance of said blocker unit and including a pivotally mounted articulated plow share carrying device, ground wheels for said device, means continuously tending to hold said wheels to the ground, and means governed by the rise and fall of said wheels in passing over the ground for shifting said plow share accordingly with respect to the surface of the ground while maintaining it a definite distance below the surface of the ground.

CARL ALF JOAKIM ANDERSEN.